Patented May 8, 1934

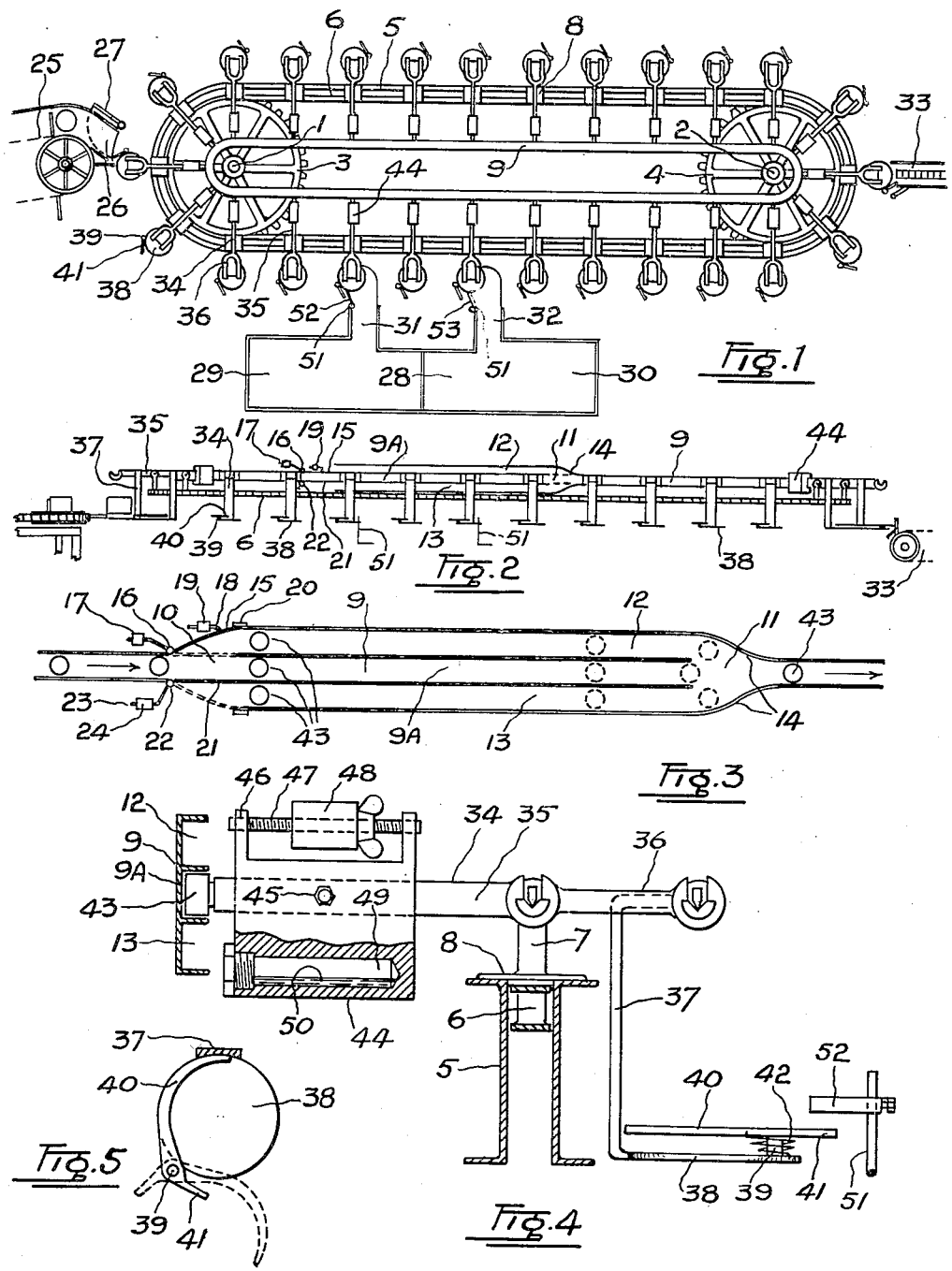

1,958,173

UNITED STATES PATENT OFFICE 1,958,173

FILLED CAN WEIGHING AND SORTING APPARATUS

William Howard Rennie, Vancouver, British Columbia, Canada, assignor to American Can Company, New York, N. Y., a corporation of New Jersey Application April 15, 1929, Serial No. 355,347

11 Claims. (Cl. 209—121)

My invention relates to improvements in filled can weighing and sorting devices which are particularly adapted for use in fish canneries, meat packing factories and the like.

The objects of this invention are to provide means whereby each can filled is deposited upon a scale and each overweight or underweight can beyond a certain tolerance is ejected for further attention. Further objects are to provide means whereby the weighing of the cans is not appreciably influenced by friction or centrifugal force on their passage through the machine; to provide means whereby the scale is caused to tip with rapidity so that speedy checking of weight can be effected, and also to provide means for adjusting the machine to allow the passage of cans to the normal discharge point having any predetermined tolerance excess or shortage of contents.

The invention consists essentially of a horizontally moving endless conveyor having a plurality of balances which are each adapted to receive a filled can and to discharge it if properly weighted at a given point, and means for holding the balances in substantially horizontal position throughout a predetermined length of their travel, and means for quickly tipping them if over or underweighted beyond a certain tolerance and for removing the cans from those balances tipped, as will be more fully described in the following specification, and shown in the accompanying drawing, in which:—

Fig. 1 is a diagrammatic plan view of the invention.

Fig. 2 is a side elevational view.

Fig. 3 is a diagrammatic detail showing the roller guides and can weight differential adjusting means.

Fig. 4 is a side elevation of one of the scale balances and its mounting.

Fig. 5 is a detail plan view of the can tripping arm.

In the drawing like characters of reference indicate corresponding parts in each figure.

The numerals 1 and 2 indicate a pair of vertical shafts, one of which is driven, having secured thereto chain sprockets 3 and 4. Arranged outwardly of the sprockets and in part concentric therewith are parallel guides 5 forming a track and preferably formed of oppositely disposed channel members, see Figure 4, having their upper edges slightly above the upper faces of the sprockets. A chain 6 passes around the sprockets and between the guides, which carries on its upper edge a plurality of balance supports or standards 7 see Figure 4, each having a flanged base 8 which is adapted to slidably engage the upper edges of the guides 5 upon which it is supported when passing from one sprocket to the other. Running parallel with and within the guides 5 and in part concentric with the shafts 1 and 2, is a further guide 9 which consists generally of a channel section, though one length thereof on the return side may have a lower flange only if desired. The guide 9 is provided intermediate its length with two gaps indicated respectively by the numerals 10 and 11 and between these gaps upper and lower guides 12 and 13 are formed, the guide 12 being referred to as the overweight and the guide 13 being referred to as the underweight guide. Converging rails 14 connect the upper member of the overweight guide 12 and the lower member of the underweight guide 13 to the flanges of the guide 9 to enclose the gap 11 thereof.

The gap 10 is adapted to be closed between adjacent sections of the guides 9 by a movable upper rail or gate 15 which is hingedly mounted as at 16 and suitably counterbalanced to the rear of its fulcrum as at 17, and this rail is fitted with a threaded arm 18 having an adjustable weight 19 which is adapted to be moved therealong so as to increase or decrease the effort required to raise the rail into the position shown in Figure 3, where it is depicted as extending from the upper member of the guide 9 to the adjacent end of the upper member of the overweight guide 12 and is brought to rest against stop 20. The lower side of the gap 10 is adapted to be closed by a movable gate or rail 21 hingedly mounted as at 22 and having a threaded arm 23 which is fitted with a counterweight 24 endwise adjustable thereon so as to vary the effort required to swing the rail downwards from its normal horizontal position to the position shown in dotted lines in Figure 3, extending from the lower flange of the guide 9 to the lower rail of the underweight guide 13.

At the loading end of the machine a can conveyor 25 of any suitable type, (graphically shown to the left of Fig. 1), is arranged for the purpose of delivering the filled cans onto a slide 26 set adjacent the path of the scale balances as they pass around the sprocket 3. The slide 26 is provided with a suitably timed trip mechanism 27 for moving the cans progressively onto the scales as they pass.

Extending to one side of the machine is a table 28 which is divided into an overweight can receiver 30 and an underweight can receiver 29 and leading onto this table is a pair of runways 32 and 31 respectively which extend outwards from points adjacent the path of travel of the cans. A discharge conveyor 33 of any suitable type extends from the path of travel of the cans adjacent the sprocket 4 for the purpose of taking away the cans containing the correct weight of filling. The scale balances generally indicated by the numeral 34 each consist of a beam 35, see Figure 4, fulcrumed in a standard 7 secured to the chain 6, the forward end of the beam is forked as at 36 to pivotally support a crank arm 37 which terminates at its base in a flat plate or pan 38 which is adapted to support a filled can.

The pan 38 is provided with an upstanding hinge pin 39, see Figure 5, upon which an arcuate ejector arm or pusher 40 having a forward projection 41 is pivotally mounted, this arm is provided with a spring 42 for the purpose of retaining it in normal position as shown, viz. substantially parallel to one side of the periphery of the pan 38.

At the inner extremity of the beam 35 is a roller 43 which is adapted normally to be engaged between the upper and lower flanges of the guide 9. Adjustably mounted upon the inner end of the beam 35 is a weight block generally indicated by the numeral 44, which is adapted to be held in any desired position by a set screw 45 and is fitted with a pair of upstanding lugs 46 which support a horizontal threaded rod 47 having a locknutted adjustable weight 48 thereon which may be set at a desired point by means of a locknut. A horizontal chamber 49 extends longitudinally of the lower part of the weight block and is adapted to be partially filled with mercury 50, which tends to quickly upset the level of the beam 35 by running to one end or the other of the chamber 49 as soon as the beam is slightly tipped.

Fitted at the entrance to the underweight table 29 is a rod 51 supporting a trip arm 52 which is set at such a height as to engage the projection 41 of the arcuate ejector arm 40 when the beam 35 is tipped upwardly by an underweight can and fitted at the entrance to the overweight table 30 is a shorter rod 51 supporting a trip arm 53 which is set at a height to engage the projection 41 when the beam is tipped downwardly by an overweight can. A trip arm 54 similar to those numbered 52 and 53 is suitably supported at the entering end of the conveyor 33, and at such a height as to engage the projection 41 of the arcuate arm 40 when the beam is carried around the sprocket 4 to discharge the correctly weighted can onto said conveyor.

Having thus described the several parts of my invention I will now briefly explain its operation.

Cans after being filled are delivered one by one from the can conveyor 25 onto the slide 26 and are moved progressively by the trip arm 27 onto the pans 38 of the balances, and in close contact with the arcuate ejector arm 40. Prior to receiving a can, the beam 35 of a scale balance is held in substantially horizontal position by its roller 43 which is riding upon the bottom flange of the guide 9 and when a can is imposed upon the pan 38 of said beam the same horizontal position of the beam is maintained irrespective of whether the can placed thereon is of normal weight, over or underweight. As the scale balance is carried forward towards the discharge conveyor 33 and its roller 43 reaches the gap 10 of the guides, if the can is correctly weighted the beam will still remain in horizontal position and the roller will pass through said gap and continue into the section 9A of the guides. If the can is slightly over or underweight, but within the allowable limits for which the balance weights 19 and 24 of the rails 15 and 21 respectively have been set, such weight differential or tolerance will be insufficient to move either of said movable rails or gates and the roller will again follow a horizontal path into the guide 9A. If a can is overweighted beyond a predetermined tolerance, the resistance to lifting of the rail or gate 15 will be insufficient to hold the beam 35 in horizontal position and the beam will tilt downward slightly under the influence of its overload, such tilting of the beam will incline to a similar extent the chamber 49 of the weight block 44, so that the mercury 50 will run rapidly along said chamber towards the can. This displacement of the mercury increases the downward tilting of the beam so as to cause the roller to lift the gate 15 against its stop 20 and in passing therealong it enters the overweight guide 12 along which it travels holding the scale pan 38 at a low level so that the projection 41 of the arcuate ejector arm engages the trip arm 53. The yielding gates 15 and 21, with their counterbalancing means 17, 19 and 24, constitute supplemental weighing means whereby a filled can is not thrown out if it is within the tolerance in weight which is permissible, and not unless it is above or below said tolerance, as will be determined by said supplemental weighing means.

The continued movement of scale balance and its pan causes the arcuate arm 40 to swing upon its hinge pin and throw the can onto the runway 32 from whence it passes onto the overweight table section 30. In a similar manner, when a scale balance beam supporting an underweighted can reaches the gap 10 the excess weight of the inner end of the beam and the weight block causes the rail 21 to be depressed and allows the roller 43 on the beam to descend and travel into the guide 13, so that the scale pan 38 being raised disposes the projection 41 of the arcuate arm 40 to be engaged by the trip arm 52 to discharge the underweighted can onto the runway 31 and onto the underweight table 29.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What I claim as my invention is:

1. A can weighing machine comprising a conveyor having a plurality of balances each having a beam and a pan capable of receiving a filled can, a guide parallel to the conveyor in which one end of the beam is adapted to travel, a gap within said guide, wherein the beam end is adapted to move transversely of its normal path when the scale pan is abnormally loaded, upper and lower guides adjacent said gap into one of which the beam end is adapted to be carried subsequent to tipping, and means for regulating the amount of over or under weighting of the can required to tip the beam to cause its end to enter either of the upper or lower guides.

2. A can weighing machine according to claim 1 in which the means for regulating the amount of over or under weighting of the can required to tip the beam is characterized by rails hingedly extending from one member of the first mentioned guides to members of the second mentioned guides, and adjustable counterweights to said rails.

3. In a can weighing and checking machine, a scale balance comprising a standard pivotally supporting a beam, one end of said beam supporting a can receiving pan, a balance weight upon the other end, a sealed horizontal chamber in said weight and supported by the beam, said chamber being partially filled with mercury whereby the tipping of the beam is accelerated following its initial movement, and means for adjusting said weight and chamber relative to said beam.

4. A can weighing and checking machine comprising an endless conveyor, a plurality of balancing beams carried thereby, each including a pan capable of receiving a filled can, a guide along which one end of each beam is adapted to travel an arcuate path and a straight path with a can supported by said pan, upper and lower parallel guides communicating with the first mentioned guide at a point along its straight path, means for directing said end of each beam into one of the parallel guides while pursuing a straight path, and incident to the tilting of the beam by an abnormally weighted can supported thereby, means for regulating the amount of abnormal weight required to tilt the beam in the proper direction with relation to one of the parallel guides, and means for removing the can from the beam while the latter is in one of the last mentioned guides.

5. In a weighing machine the combination of a conveyor having balances to carry objects of different weights, guides at a suitable part of the path of the conveyor to maintain said balances at a high, low or intermediate position, and yielding weighing means cooperating with said guides which may allow said balances maintained in said intermediate position to be maintained in said high or low position according to the weight of the carried object.

6. In combination with conveying means having balancing carriers thereon for filled cans, a guide arranged near a portion of the path of said conveyor having a guiding portion for cans of the proper weight, a guiding portion for cans of too little weight and a guiding portion for cans of too much weight, the guiding being effected by the engagement of a part of said can carrier with a part of said guiding means, and yielding means controlling the passage of said part of the can carrier from one to another of said guiding portions.

7. In a can weighing and checking machine, an endless conveyor adapted to follow an arcuate path and a straight path, a scale balance mounted upon said conveyor and adapted to receive a filled can to be checked as to weight, a pair of yielding members normally parallel with each other, but movable one away from the other by an abnormal weight can while said conveyor is following said straight path, and can ejecting means associated with said balance for discharging a can at one of a plurality of points according to its weight.

8. In a machine for weighing and sorting filled containers, in combination, an endless chain conveyor, a series of scale balances carried by said conveyor and adapted to receive and weight filled containers, a central guideway for maintaining the beam of said balances in horizontal position when a said container is of normal weight, upper and lower guideways for maintaining said balances in tipped position when said containers are heavier or lighter than normal, and yielding members between said central guideway and said upper and lower guideways adapted to determine the travel of said beam in one of said guideways in accordance with the weight of a container.

9. In a can-weighing and sorting machine, the combination of a series of balance supports, scale beams fulcrumed on said supports, an endless flexible conveyer connecting and propelling said supports and beam, can-supporting means carried by the outer ends of said beams, a fixed track passing longitudinally along the sides and around the ends of the machine and guiding said balance supports, upper, lower and intermediate guides for the inner ends of said scale beams extending longitudinally of the machine within said track, said guides having gaps whereby the inner end of a scale beam may pass from the intermediate guide to either the upper or lower guide, and devices at different stations for removing the properly, under and over weighted cans from said can supporting means.

10. In a can-weighing and sorting machine, the combination of a series of balance supports, scale beams fulcrumed on said supports, an endless flexible conveyer connecting and propelling said supports and beams, can-supporting means carried by the outer ends of said beams, a fixed track passing longitudinally along the sides and around the ends of the machine and guiding said balance supports, upper, lower and intermediate guides for the inner ends of said scale beams extending longitudinally of the machine within said track, said guides having gaps whereby the inner end of a scale beam may pass from the intermediate guide to either the upper or lower guide, devices at different stations for removing the properly, under and over weighted cans from said can supporting means, and tables at different levels at said stations on to which cans are propelled in upright position by said removing devices.

11. In a can-weighing and sorting machine, the combination of a series of balance supports, scale beams fulcrumed on said supports, an endless flexible conveyer connecting and propelling said supports and beams, can-supporting means carried by the outer ends of said beams, a fixed track passing longitudinally along the sides and around the ends of the machine and guiding said balance supports, upper, lower and intermediate guides for the inner ends of said scale beams extending longitudinally of the machine within said track, said guides having gaps whereby the inner end of a scale beam may pass from the intermediate guide to either the upper or lower guide, devices at different stations for removing the properly, under and over weighted cans from said can supporting means, and can supports having knife edges whereby they are swung from said beams.

WILLIAM HOWARD RENNIE.